United States Patent Office 3,098,794
Patented July 23, 1963

3,098,794
PROCESS FOR TREATING HUMAN HAIR WITH AMINO OXIDE COMPOSITIONS
Roman Dohr, Dusseldorf, and Wilhelm Jakob Kaiser, Dusseldorf-Holthausen, Germany, assignors to Therachemie Chemisch therapeutische Gesellschaft m.b.H., Dusseldorf, Germany, a corporation of Germany
No Drawing. Filed July 20, 1960, Ser. No. 44,001
Claims priority, application Germany Aug. 8, 1959
4 Claims. (Cl. 167—87)

The invention relates to agents for the treatment of hair and, more particularly, for the treatment of human hair with additives to these agents consisting of amino oxides having at least 8 carbon atoms in their molecules.

Numerous agents have been proposed which are to serve for washing, dyeing and grooming of hair. According to the composition of these agents, they may fulfill one or more of these purposes.

It now has been found that an addition of amino oxides having at least 8 carbon atoms in their molecules to such agents offers manifold advantages.

These amino oxides increase the consistency of the hair treating agents and improve the emulsifiability of the individual ingredients. Simultaneously, the amino oxides have bactericidal and fungicidal action and, moreover, impart a special sheen to the hair. The amino oxides can be applied in all those instances in which, up to now, it had been necessary to incorporate a plurality of compounds in order to obtain the effects named. Finally, the amino oxides possess high washing and cleansing effect, are resistant to hardness-formers in water and produce a good lather so that they are eminently suited as bases for shampoos.

Hair-grooming agents are now being sold which are suitable for simultaneous washing, dyeing and grooming of human hair. Such agents contain wetting agents, hair-grooming compounds, e.g., cholesterol, and dyeing components. For the latter purpose, frequently the so-called oxidation dyes are used, such as sulfates or chlorohydrates of p- or m-toluylene diamine, aminophenols, p-aminodiphenyl amine, 2.4-diamino anisol and similar compounds. An addition of amino oxides to agents as described here, either alone or together with other wetting agents, has proven highly advantageous.

However, upon the employment of the dyes named above, the addition of components having oxidizing action immediately before the dyeing process is required. Such a component can be, e.g., urea percarbamide or a hydrogen peroxide solution. Hence, it has been proposed to use the so-called direct dyes in lieu of the oxidation dyes. It has been found that those direct dyes are of advantage which contain quaternary ammonium groups, particularly those which are free of acidic groups and in which the carrier of the dyestuff character is the cation. Representative for such dyes are, among others, azo-, nitro, indigo- or anthraquinone dyes, either singly or in combination. Of the azo dyes which fall into this category, frequently those are preferred which contain at least one basic group and, in certain instances, also a nitro group. Hair dyes of this kind have been disclosed in Belgian Patent 576,014 and in one of the present inventors' co-pending application Serial Number 793,986, filed February 18, 1959.

Upon the employment of amino oxides in hair-dyeing agents containing direct dyes, it has been found opportune to use these amino oxides alone instead of the formerly used wetting agents, since it has been established that unexpectedly an increase in intensity of the color occurs, aside from the other advantages named above.

The amino oxides suited for the new hair treating method are produced in the conventional manner, for instance by oxidation of secondary or tertiary aliphatic, aromatic or cycloaliphatic amines with hydrogen peroxide. The starting materials may be pure amines or technical amine mixtures.

If desired, the technical amino oxides obtained in the preparation described above can be used for the hair treating agents according to the invention. The amino oxides listed below (Formulae 1–11) are applicable, either singly or in mixture.

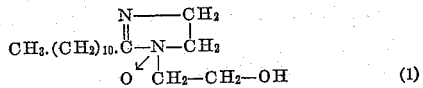
(1)

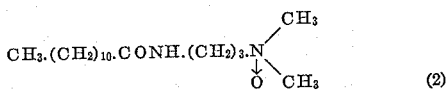
(2)

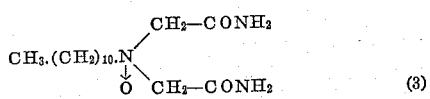
(3)

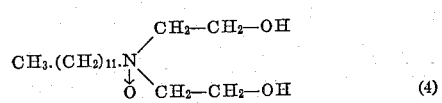
(4)

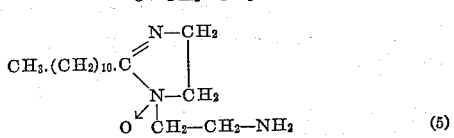
(5)

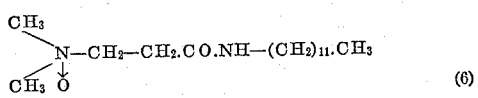
(6)

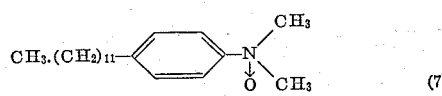
(7)

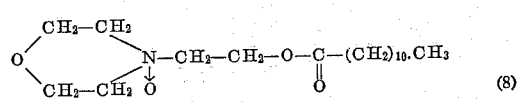
(8)

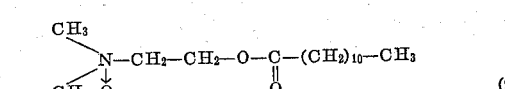
(9)

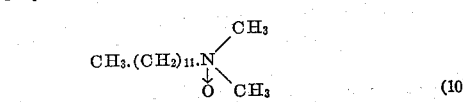
(10)

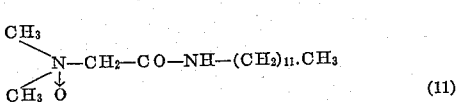
(11)

According to the end use, the hair treating agents are prepared by mixing the individual components, for instance the dyes and the amino oxide or oxides, whereby, if desired, other customary additives can be incorporated, such as perfumes, thickeners (e.g., fatty alcohols, methyl cellulose) or such materials as fatty acid alkylol amides. In some instances, it is desirable to add organic solvents, which are miscible with water either completely or partially. Preferred are lower alcohols, such as isopropanol and butanol, lower-molecular ketones, e.g., methyl ethyl ketone, glycols, and mixtures thereof. The choice of these ingredients is dependent upon the consistency, i.e., whether the hair treating agent is to be liquid, pasty or solid, and also upon the specific purpose of application. The quantity of amino oxide used, likewise, depends thereon. In cases in which the hair treating agents are to serve solely as a hair wash, it is feasible to employ solely a suitable amino oxide, without any other additives.

The invention now will be further illustrated by a number of examples. However, it should be understood that these are given merely by way of explanation, not of limitation, and that numerous changes in the details may be made without departing from the spirit and the scope of the invention as hereinafter claimed.

All parts given are by weight unless otherwise stated.

*Example 1*

An agent eminently suited for simultaneous washing, dyeing and grooming of human hair is obtained by mixing 100 parts water, 10 parts coconut dimethyl amino oxide, and 0.5 part of a dye having the Formula 12:

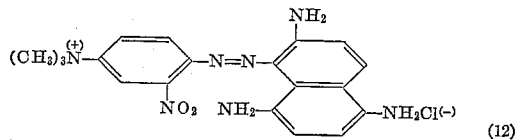
(12)

The viscous liquid obtained has a viscosity favorable for the direct application to the hair. When allowed to act on gray hair for approximately 15–30 minutes and after rinsing it off, the hair has a natural deep black color, is easily groomable, has good sheen and a soft feel. The hair lies down and has antistatic properties.

*Example 2*

An agent in gel form, serving the same purposes as given in Example 1, is obtained from a solution of 30 parts coconut diethanolamino oxide, 15 parts paraffin oil and 5 parts Vaseline, which is stirred at 80° C. into a solution of 0.5 part of a dye having Formula 13:

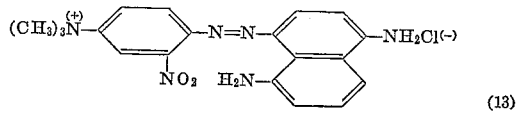
(13)

in 45 parts water. The mixture is allowed to cool under continued agitation. The gel thus obtained, when applied to gray hair and allowed to act thereon for 15 to 20 minutes, imparts to the hair a full chestnut-brown color. Upon rinsing off this gel, a dense creamy lather develops.

*Example 3*

A cream for washing and dyeing of hair is obtained by dissolving in 190 parts water 10 parts of a dye of Formula 14:

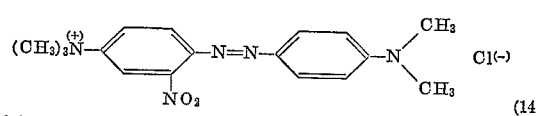
(14)

and by stirring this solution at approximately 50° C. into an emulsion consisting of 150 parts dimethyl tallowamino oxide in 300 parts water. The pH is adjusted to 9 with aqueous ammonia. This cream dyes hair a brilliant titian-red within 20 minutes. On rinsing with water, a dense and creamy lather develops which has a soothing effect on the scalp and which imparts to the hair a silky feel, characteristic sheen and antistatic properties.

*Example 4*

In 400 parts water the following components are mixed: 10 parts of a dye having the Formula 15:

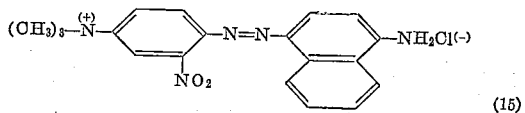
(15)

1 part of a dye having the Formula 16:

(16)

150 parts paraffin oil, 50 parts Vaseline, 50 parts oleic acid oleyl ester, and 300 parts of the oxidation product of lauric acid dimethyl aminopropyl amide. A transparent, highly viscous dyeing paste is obtained whose pH is adjusted to 9 with ammonia. When this paste is applied to gray hair for approximately 30 minutes and then is rinsed off, the hair has a warm mahogany color, vivid sheen and soft feel.

*Example 5*

10 parts of a dye of Formula 17:

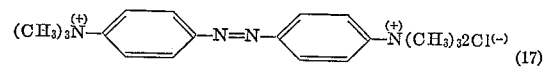
(17)

are dissolved in 600 parts water together with 30 parts fatty acid ethanolamide and 120 parts myristyl dimethylaniline oxide, and the pH is adjusted to 9. Gray hair treated with this solution acquires a brilliant goldblond color.

*Example 6*

100 parts of the oxidation product of palmitic acid dimethylamino ethanol ester are mixed with 4 parts of a dye of Formula 18:

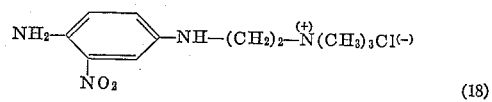
(18)

and 1 part of a dye of Formula 19:

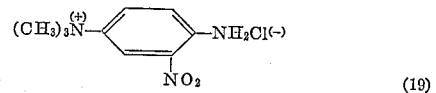
(19)

further with 50 parts of a fatty alcohol having 12 to 18 carbon atoms and 1,000 parts water. Mixing is accomplished with strong agitation at 50° C. The pH is adjusted to 9 with ammonia. After allowing this emulsion to cool, the latter, when applied to gray hair, dyes the same a light brown within approximately 30 minutes and imparts a natural sheen.

*Example 7*

8 parts tallow diethanolamino oxide, 2 parts stearyl dimethylamino oxide, 1.5 parts of a dye of Formula 20:

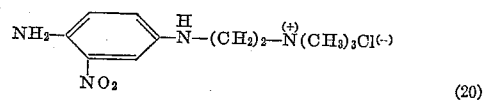
(20)

1.4 parts of a dye of Formula 21:

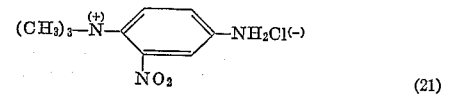
(21)

1.2 parts of a dye of Formula 22:

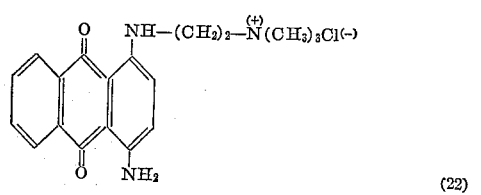
(22)

are mixed with agitation at 50° C. and with addition of a trace of lavender oil. The pH is adjusted to 9, and the emulsion is allowed to cool. This compound dyes gray hair a blue black within 30 minutes.

*Example 8*

| | Percent |
|---|---|
| Fatty alcohol ($C_{16}$–$C_{18}$) | 18 |
| Coconut alcohol | 2 |
| Amino oxide | 20 |
| Water | 60 |

This is prepared by melting the first two components together and adding thereto under agitation the amino oxide dissolved in a part of the water. The remainder of the water is added gradually under continued agitation. A white, water-soluble paste is obtained which imparts to the hair treated therewith softness and high sheen.

*Example 9*

|   | Percent |
|---|---|
| Fatty alcohol ($C_{16}$–$C_{18}$) | 10 |
| Cellulose glycolate | 4 |
| Amino oxide | 20 |
| Water | 66 |

The amino oxide and the cellulose glycolate are dissolved in the water, and this solution is stirred into the molten fatty alcohol. The white cream thus obtained strengthens the hair and imparts to it a silky feel.

*Example 10*

|   | Percent |
|---|---|
| Fatty alcohol ($C_{14}$–$C_{18}$) | 15 |
| Amino oxide | 20 |
| Water | 46 |
| Butanol | 6 |
| Isopropanol | 12 |
| Janus brown R | 1 |

(Janus brown R and its composition are described in Ullmann's Encyklopaedie der technischen Chemie, vol. 4, page 126.)

The fatty alcohol is melted, and the mixture of isopropanol and butanol is added thereto. The amino oxide and dye are mixed separately with part of the water, and this mixture is added to the fatty alcohol and the alcohols with agitation. The remainder of the water then is added under continued agitation. A water-soluble cream is obtained which foams well and which dyes gray hair intensely brown within 15 minutes.

NOTE.—The amino oxides applicable to Examples 8–10 are those listed as Formulae 1–11, either individually or, if desired, in combination.

*Example 11*

47.2 parts mixed cetyl- and stearyl alcohols
5.9 parts coconut fatty alcohol (from fatty acids of coconut oil)
62.0 parts amino oxide of formula

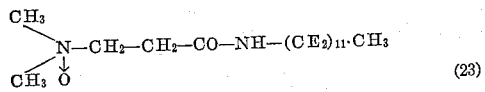  (23)

419.0 parts water

To the melted fatty alcohol, the amino oxide, dissolved in a small quantity of water, is added under agitation at 80° C. The mixture is allowed, with continued agitation, to cool slowly to 40°, and the remainder of the water is added in small portions. A stable emulsion of good consistency thus is obtained which is eminently suited for washing of hair. If desired, electrolytes can be added to this emulsion since the latter is particularly insensitive thereto.

*Example 12*

A hair washing agent is prepared by mixing 20 parts of coconut fatty alcohol ($C_{12}$–$C_{18}$), 3 parts coconut fatty acid diethanol amide, 3.5 parts isopropanol, 0.5 part perfume oil and 91 parts amino oxide of formula

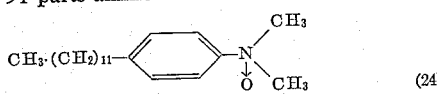  (24)

while warming. A clear wash paste is obtained which exhibits an extraordinarily strong laterability even at high fat load.

*Example 13*

For the manufacture of a foaming and washing cold wave compound, 7.5 parts thioglycolic acid and 10 parts amino oxide of formula

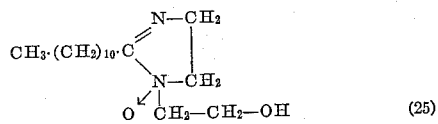  (25)

are dissolved in 70 parts water. By addition of concentrated $NH_3$, the pH is adjusted to 9, and perfume oil and water are added to make 100 parts. With this solution, the hair is treated in the customary manner to impart to it a permanent wave.

We claim as our invention:

1. A process for the simultaneous washing, dyeing and grooming of human hair, which comprises rubbing said hair with a liquid mixture of a cationic hair dye and a compound selected from the group consisting of aliphatic, aromatic and heterocyclic amino oxides having at least 8 carbon atoms in their molecules, leaving said mixture on said hair to act thereon, for a period of substantially 15 to 30 minutes, rinsing said hair with water and removing said mixture.

2. A process for the simultaneous washing, dyeing and grooming of human hair, which comprises rubbing said hair with a liquid mixture of a cationic hair dye having quaternary ammonium groups and a compound selected from the group consisting of aliphatic, aromatic and heterocyclic amino oxides having at least 8 carbon atoms in their molecules, leaving said mixture on said hair to act thereon for a period of substantially 15–30 minutes, rinsing said hair with water and removing said mixture.

3. A process for the simultaneous washing, dyeing and grooming of human hair, which comprises rubbing said hair with a liquid mixture of a hair dye selected from the group consisting of azo-, nitro- indigo- and anthraquinone dyes, being cationic and having quaternary ammonium groups, and a compound selected from the group consisting of aliphatic, aromatic and heterocyclic amino oxides having at least 8 carbon atoms in their molecules, leaving said mixture on said hair to act thereon for a period of substantially 15 to 30 minutes, rinsing said hair with water and removing said mixture.

4. A process for washing and grooming of human hair, which comprises rubbing said hair with a liquid mixture of fatty alcohols and a compound selected from the group consisting of aliphatic, aromatic and heterocyclic amino oxides, leaving said mixture on said hair to act thereon for a period of substantially 15 to 30 minutes, rinsing said hair with water and removing said mixture.

References Cited in the file of this patent

UNITED STATES PATENTS 1,887,995    Conzetti                 Nov. 15, 1932

FOREIGN PATENTS 437,566    Great Britain            Oct. 31, 1955

OTHER REFERENCES

Venkataraman: Chem. of Synthetic Dyes, vol. 1, Academic Press, Inc., New York (1952), pp. 520–522.
Smith: Mfg. Chemist, 28: 6, June 1957, pp. 281–284.
Moore et al.: Mfg. Chemist, 29: 5, May 1958, pp. 194–198.